United States Patent
Shah et al.

(10) Patent No.: US 8,819,582 B2
(45) Date of Patent: *Aug. 26, 2014

(54) MOBILE BROWSER CONTEXT SWITCHING

(75) Inventors: Roma Shah, San Francisco, CA (US);
Nicholas Jitkoff, Palo Alto, CA (US);
Glen Murphy, Palo Alto, CA (US);
Arnaud Weber, Saratoga, CA (US);
Michael Feldstein, Mountain View, CA (US); Alex Ainslie, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/247,924

(22) Filed: Sep. 28, 2011

(65) Prior Publication Data

US 2012/0278757 A1    Nov. 1, 2012

Related U.S. Application Data

(63) Continuation of application No. 13/094,489, filed on Apr. 26, 2011.

(51) Int. Cl.
*G06F 3/048* (2013.01)

(52) U.S. Cl.
USPC .......................................... 715/790; 715/765

(58) Field of Classification Search
USPC ................... 715/790, 765, 781, 863
See application file for complete search history.

(56) References Cited

U.S. PATENT DOCUMENTS

| | | | |
|---|---|---|---|
| 4,862,389 A * | 8/1989 | Takagi | 715/794 |
| 5,377,317 A * | 12/1994 | Bates et al. | 715/789 |
| 5,388,202 A | 2/1995 | Squires et al. | |
| 5,430,838 A | 7/1995 | Kuno et al. | |
| 5,515,494 A | 5/1996 | Lentz | |
| 5,588,106 A | 12/1996 | Habata | |
| 5,630,042 A * | 5/1997 | McIntosh et al. | 715/744 |
| 5,859,639 A | 1/1999 | Ebrahim | |
| 5,920,313 A * | 7/1999 | Diedrichsen et al. | 715/767 |
| 6,008,809 A * | 12/1999 | Brooks | 715/792 |
| 6,405,222 B1 * | 6/2002 | Kunzinger et al. | 715/205 |
| 6,750,858 B1 * | 6/2004 | Rosenstein | 715/790 |
| 6,873,341 B1 | 3/2005 | Adams et al. | |
| 7,272,787 B2 * | 9/2007 | Nakamura et al. | 715/234 |
| 7,725,823 B2 * | 5/2010 | Wakai | 715/273 |

(Continued)

FOREIGN PATENT DOCUMENTS

| | | |
|---|---|---|
| EP | 1901186 A1 | 3/2008 |
| WO | WO-2006092464 A1 | 9/2006 |

*Primary Examiner* — Phenuel Salomon

(74) *Attorney, Agent, or Firm* — McDermott Will & Emery LLP

(57) ABSTRACT

Methods and systems for processing and displaying content are disclosed. An example method of operation may include initializing two or more windows on a mobile device, and displaying a first window of the two or more windows on the mobile device. The method may also include receiving an on-screen switcher indication causing a display view change from the first window being displayed to a combination of the first window and at least one more additional windows being displayed. The method may also include determining a space amount for each of the two or more windows, adjusting a size of each of the two or more windows based on the space amount. The method may further include displaying a frame around each of the two or more windows with the respective adjusted size, and displaying each frame overlaid on top of one another.

15 Claims, 5 Drawing Sheets

(56) References Cited

U.S. PATENT DOCUMENTS

| | | |
|---|---|---|
| 7,739,604 B1 | 6/2010 | Lyons et al. |
| 2002/0054052 A1* | 5/2002 | Sharma et al. ............. 345/700 |
| 2002/0145611 A1 | 10/2002 | Dye et al. |
| 2003/0193524 A1 | 10/2003 | Bates et al. |
| 2004/0012615 A1* | 1/2004 | Jang ............................ 345/661 |
| 2004/0103371 A1* | 5/2004 | Chen et al. .................. 715/513 |
| 2004/0189710 A1* | 9/2004 | Goulden et al. ............ 345/790 |
| 2005/0015726 A1 | 1/2005 | Tuominen |
| 2005/0021851 A1* | 1/2005 | Hamynen .................... 709/245 |
| 2005/0188298 A1 | 8/2005 | Makela |
| 2006/0020902 A1 | 1/2006 | Tabi |
| 2006/0036944 A1 | 2/2006 | Wilson |
| 2006/0117269 A1 | 6/2006 | Lai et al. |
| 2006/0126729 A1 | 6/2006 | Nakayama |
| 2006/0253791 A1 | 11/2006 | Kuiken et al. |
| 2007/0101298 A1* | 5/2007 | Yolleck et al. ............... 715/850 |
| 2007/0168878 A1* | 7/2007 | Berstis et al. ............... 715/790 |
| 2007/0192726 A1* | 8/2007 | Kim et al. .................... 715/781 |
| 2008/0115081 A1* | 5/2008 | Sankaravadivelu et al. .. 715/783 |
| 2008/0122796 A1 | 5/2008 | Jobs et al. |
| 2008/0168401 A1 | 7/2008 | Boule et al. |
| 2008/0184158 A1* | 7/2008 | Selig ............................ 715/781 |
| 2010/0093325 A1 | 4/2010 | Jang |
| 2010/0146449 A1* | 6/2010 | Brown et al. ................ 715/835 |
| 2010/0220978 A1* | 9/2010 | Ogikubo ........................ 386/95 |
| 2010/0248788 A1* | 9/2010 | Yook et al. ................... 455/566 |
| 2011/0047491 A1 | 2/2011 | Hwang et al. |
| 2011/0197156 A1 | 8/2011 | Strait et al. |

* cited by examiner

MOBILE BROWSER CONTEXT SWITCHING

CROSS REFERENCE TO RELATED APPLICATIONS

The present application is a continuation of U.S. application Ser. No. 13/094,489 filed Apr. 26, 2011, which is incorporated herein by reference in its entirety.

BACKGROUND

1. Technical Field

The field relates to operating systems, software applications and user interface devices, and, more particularly, to a system, method, apparatus or non-transitory computer program product of scaling multiple browser contexts within the display area of a mobile device display.

2. Background

A web browser is commonly used with computational devices, such as laptops, smartphones, tablet computing devices, personal digital assistants (PDAs), etc. Web browsers continue to grow in popularity as a tool used to access a particular web page, and perform related features. It is common for a user's homepage to include customized user settings, such as a default web page, and other sources of information. For example, customized web pages may include local weather, email, text messaging, horoscopes, video plug-ins, backgrounds, etc.

Currently, web browsers use a tab metaphor to represent a browser context presently running within the browser. A web browser may have multiple browser contexts running at any given time. Any of the browser contexts may be selected for display via their respective tabs. Each tab is associated with a corresponding uniform resource locator (URL) field that includes a web address. Also, some additional tools or buttons may be present allowing the user to navigate backward and forward between the various browser contexts. Each tab can be selected at any time providing the user with the option to switch to a different browser context.

On mobile devices, the tab metaphor cannot be used to represent browsing contexts because the screen real estate is not large enough. Within the display area of a mobile device, tabs would occupy a large portion of the screen and would not scale very well horizontally as the number of tabs increases. Tabs would also be more difficult to select given the imprecision inherent to small screen touch-based user interface.

BRIEF SUMMARY

In an embodiment, a method may include initializing two or more windows on a mobile device, and displaying a first window of the two or more windows on the mobile device. The method may also include receiving an on-screen switcher indication causing a display view change from the first window being displayed to a combination of the first window and at least one more of the two or more additional windows being displayed, determining a space amount for each of the two or more windows, adjusting a size of each of the two or more windows based on the space amount, displaying a frame around each of the two or more windows with the respective adjusted size, and displaying each frame overlaid on top of one another.

In another embodiment, a system may include a content adjustor, implemented with a computing device, configured to perform various operations. Those operations may include to initialize two or more windows on a mobile device, provide a display a first window of the two or more windows on the mobile device, receive an on-screen switcher indication causing a display view change from the first window being displayed to a combination of the first window and at least one more of the two or more additional windows being displayed, determine a space amount for each of the two or more windows, and adjust a size of each of the two or more windows based on the space amount. The system may also include a display device configured to display a frame around each of the two or more windows with the respective adjusted size, and display each frame overlaid on top of one another.

In another embodiment, a non-transitory computer readable storage medium is configured to store instructions that when executed causes a processor to perform certain operations. The operations may include initializing two or more windows on a mobile device, displaying a first window of the two or more windows on the mobile device, receiving an on-screen switcher indication causing a display view change from the first window being displayed to a combination of the first window and at least one more of the two or more additional windows being displayed, determining a space amount for each of the two or more windows, and adjusting a size of each of the two or more windows based on the space amount. The operations may also include displaying a frame around each of the two or more windows with the respective adjusted size, and displaying each frame overlaid on top of one another.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments described herein refer to illustrations for particular applications. It should be understood that the invention is not limited to the embodiments. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Example embodiments may provide a way to visualize and switch between several browser contexts currently displayed on a mobile device. The browser contexts may be optimized for touch-based mobile devices that are equipped with a small screen. Example embodiments provide a way for users to have multiple browser contexts displayed on a mobile device having a relatively small display screen. Each browser context is represented by a frame that encloses the browser context. The frame may include a web page viewable to the user. Frames may overlap freely, allowing users to select which browser context they would like to view or interact with at any given time.

Figure 1A:
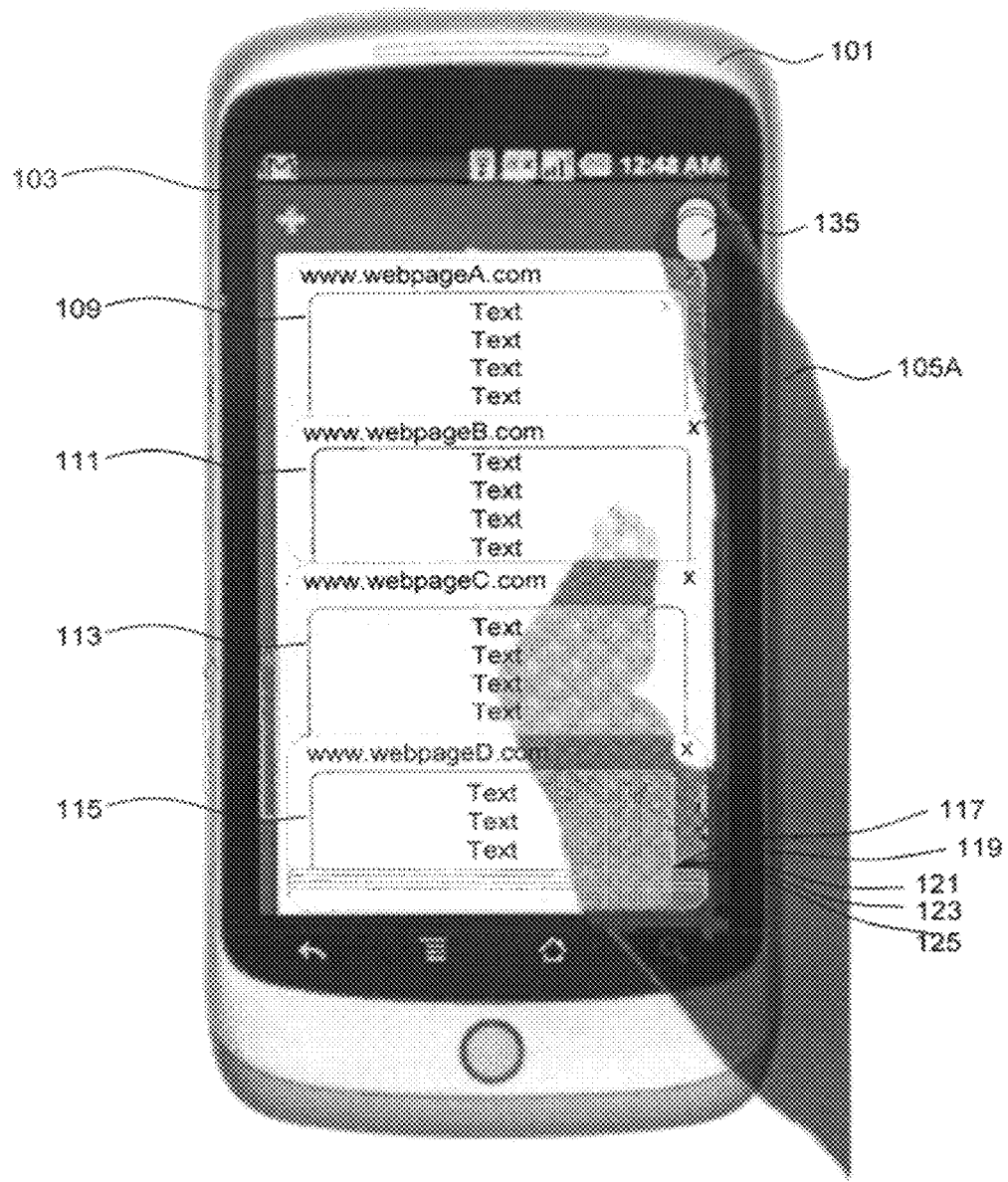
FIG. 1A is an illustration of a hand held user computational device displaying a set of browser contexts, according to an embodiment.

FIG. 1A is an illustration of a hand held user computational device displaying a set of browser contexts, according to an embodiment. Referring to FIG. 1A, a handheld mobile device 101, such as a cellular phone, mobile station, smartphone or other handheld computational device is shown. The handheld device 101 includes a display area 103, which the user may view and control via a touch screen sensor configuration overlaid on the display area 103. A user hand silhouette 105A is illustrated as controlling the viewable content of the display area 103. For example, the user may be viewing one browser context and may select a switcher icon 135 to change the view from one browser context to multiple browser contexts. In this example, by selecting the switcher icon 135, the user's view switched from one browser context (not shown) to the current view of frames 109, 111, 113 and 115. Additional frames 117, 119, 121, 123, and 125 are stacked at the bottom of the page. Each of the plurality of frames may be open and running within the context of an operating system of the mobile device 101.

In operation, the user may select a browser application and launch a browser context. The initial browser context may be opened and viewable as a homepage linked to the browser. The user may navigate to a particular web address and download a web page of interest. Upon selecting a web page, the user may desire to open additional browser contexts to view additional web pages without closing or navigating away from the previously accessed web page. As multiple browser contexts are opened, a queue or list of browser contexts may be displayed by a group of frames 109, 111, 113, 115, 117, 119, 121, 123, and 125. Frame 109 may include a first webpage "www.webpageA.com" of a first browser context, and additional webpages "www.webpageB.com", "www.webpageC.com", "www.webpageD.com", "www.webpageE.com" "www.webpageF.com" "www.webpageG.com" "www.webpageH.com" and "www.webpageI.com" may be displayed in additional frames 111, 113, 115, 117, 119, 121, 123, and 125, respectively.

The order of the frames 109, 111, 113, 115, 117, 119, 121, 123, and 125 may be dictated by the order of accessing the webpages via the browser application. For example, the user may launch a browser application and access a first webpage, then minimize or move the current view of that webpage via its browser context in order to launch additional browser contexts. Switching views may be performed by selecting the switcher icon 135. This procedure may be performed multiple times to launch numerous different browser contexts and corresponding frames containing web pages. As the number of frames continues to increase, the display may only provide a maximum number of viewable frames at any given time. In the present view of FIG. 1A, only four frames 109, 111, 113, and 115 are displayed at a time. The other frames, 117, 119, 121, 123 and 125 are stacked at the bottom of the display area 103. The number of frames viewable per display may vary. However, the display screen real estate is limited to only a finite number of frames.

Figure 1B:
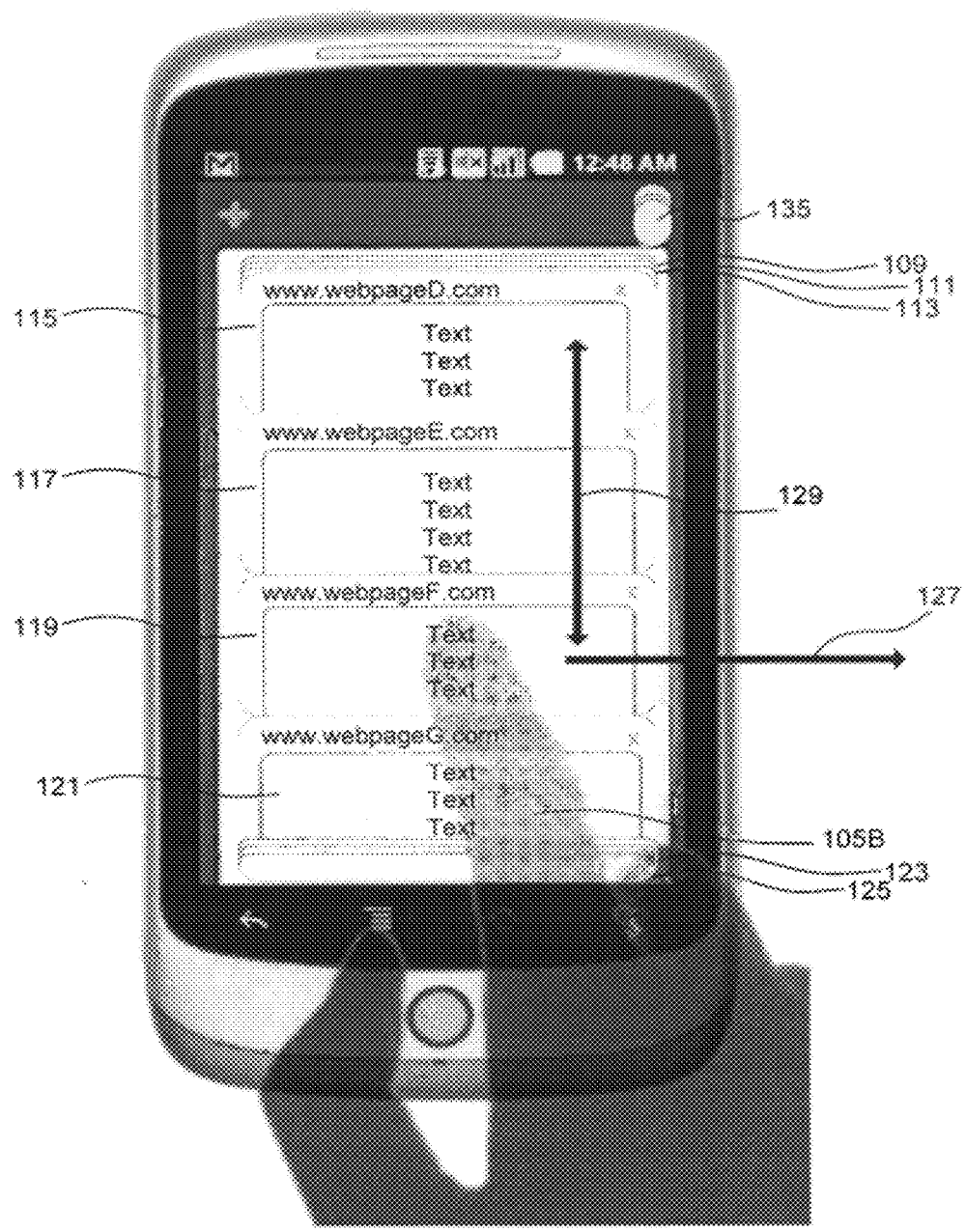
FIG. 1B is an illustration of a hand held user computational device displaying an additional set of browser contexts, according to an embodiment.
Figure 1C:
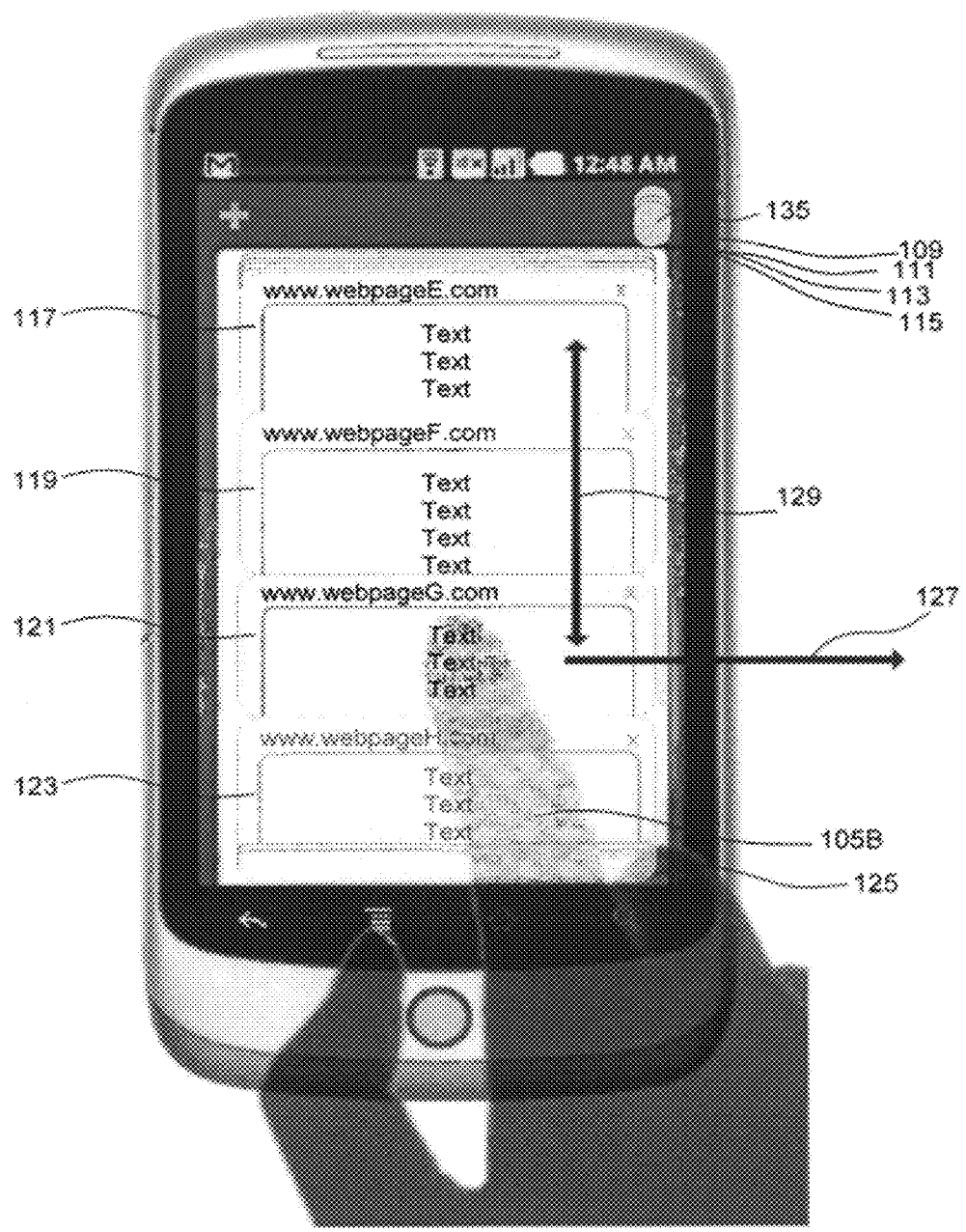
FIG. 1C is an illustration of a hand held user computational device displaying an additional set of browser contexts, according to an embodiment.

FIG. 1B is an illustration of a hand held user computational device displaying another set of browser contexts, according to an example embodiment. Referring to FIG. 1B, the user may perform a scrolling operation by scrolling upward from the bottom of the screen, as indicated by the arrow 129, additional frames not previously illustrated may effectively scroll into the viewing area of the display area 103 due to the user's scrolling movement. For example, frames 117, 119, and 121 are additional frames containing different browser contexts that may not have been visible prior to the user's hand movement scrolling upward as indicated by the user's hand position 105B. The user hand movement 105B scrolling upward caused the additional frames 117, 119, and 121 to be visible, while stacking frames 109, 11, and 113 at the top of the screen. Frame 115 from FIG. 1A is still visible at the bottom of the display area 103. Frames 123 and 125 remain stacked at the bottom. Additional user hand movements may cause browser contexts to be removed or added. For example, a downward scrolling, or by touching a particular browser context and moving to the right, as indicated by arrow 127, may cause the manipulated browser context to be permanently removed from the list of available browser contexts included in the display area 103. The user can continue to scroll upward with the movement 105B as shown in FIG. 1C and frame 115 is then stacked at the top with frames 109, 11, and 113. Frame 123 is now visible in display area 103, and frame 125 remains stacked at the bottom of the display area.

As indicated above, browser contexts may include a web page. Referring again to FIG. 1B, a toolbar at the top of the display screen 103 may include a switcher icon 135. The switcher icon 135 may operate to turn on the page switcher mode. When the switcher icon 135 is selected, the current page size may be slightly reduced as if the visible area zoomed out by approximately 10-15%. This modification to the area reveals a frame for each web page. Each frame features the corresponding web page title, a favicon illustration indicative of the logo or certain content of the web page (not shown) and an option to close the frame and its corresponding contents. A favicon can also be referred to as a shortcut icon, a website icon, a URL icon, or a bookmark icon. The favicon is a file containing one or more small icon associated with a particular webpage or website.

Other frames and their corresponding web pages are overlapped over or under the current web page frame. The present view of the display 103 may include from 1 to N web pages, the layout divides the available vertical space evenly between web pages. Beyond N pages, the layout decreases the visible area for each web page progressively, starting from the current page. Such a display configuration may be derived from a display algorithm. For example, the spacing available for each web page is determined by the formula: (HeightOfTotalArea−padding)/(NumberOfPages*ScaleAmount). The "HeightOfTotalArea" is the total area available for viewing in the display area 103, the "padding" is the distance between each frame, the "NumberOfPages" is the total number of browser contexts open and the "ScaleAmount" is a scaling variable that is inversely proportional to the total number of browser contexts open. For example, the larger the number of browser contexts open, the smaller the scale amount will be to accommodate each of the browser contexts as a percentage of the total display area height.

The spacing may also be capped to a minimum amount (e.g., 230 pixels) to ensure that there is always enough of the page visible for other purposes. On the top and bottom of the screen, the user can view a stack of pages. Touching the stack automatically expands the stack from the top or bottom. For example, if a user touched the stack in FIG. 1A at the bottom where frames 117, 119, 121, 123, and 125 are stacked, the frames expand from the bottom upward with frames 119, 121, 123, and 125 visible and frames 109, 111, 113, 115, and 117 stacked at the top of the display area. Touching the stack at the bottom would expand the frames upward until no more frames were left at the bottom of the display area. The same is true if the use movement was touching the stack at the top of the screen. Then the frames expand from the top downward. For example if the user touched the stack in FIG. 1C at the top where frames 109, 111, 113, and 115 are stacked, then the stack opens downward and frames 109, 111, 113, and 115 are displayed with frames 117, 119, 121, 123, and 125 stacked at the bottom. Touching the stack at the top would expand the frames downward until no more frames were left at the top of the display area.

An example formula used for stacking browser context frames at the top of the screen is discussed below. Frames may move freely and linearly up to a certain degree. Thereafter, the frames begin to decelerate using a dampening curve, such as (y/2)+0.5)^2 which is multiplied to its linear vertical position. This is bounded at the top by a constant value. Users can control the frame overlapping feature to navigate to the frame that contains their desired browser context. For example, each frame can be moved by sliding the frame by touching the screen. In the switcher, pressing the switcher icon 135 selects the page that was previously visible. This allows users to easily and naturally identify web pages included in browser context frames, since they are only slightly smaller 10% to 15% than normal and are still readable.

While overlapping frames may obscure some web page contents, web sites are generally designed to have some strong brand identity at the top of the page. This allows an optimized view to be displayed at the top of each web page at almost full size. As noted above, the constant "N" may be currently set to a value, such as 2, 3 or 4 on mobile phones. Examples discussed above are described in portrait mode but modifications may also be adapted to display content in landscape mode with frames ordered horizontally.

Figure 2:
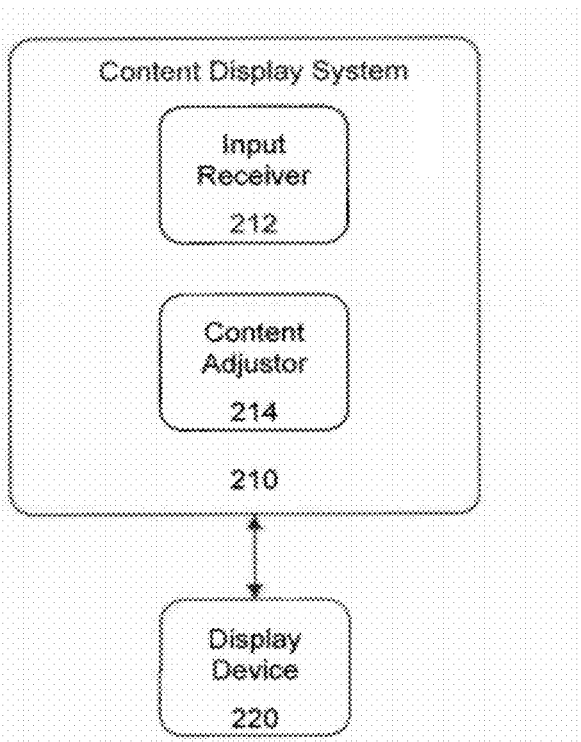
FIG. 2 is an illustration of a display system, according to an embodiment.

FIG. 2 is a block diagram of a content display system 210 configured to perform content display operations, according to an embodiment. System 210, or any combination of its components, may be part of or may be implemented with a computing device. Examples of computing devices include, but are not limited to, a computer, workstation, distributed computing system, computer cluster, embedded system, stand-alone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

System 210 may include an input receiver 212 and a content adjustor 214. The system 210 is in communication with a display device 220, which may be used to display any of the example display configurations discussed in detail above.

The input receiver 212 may receive a command to perform a display operation. The content adjustor 214 may use the command to initiate a content display of one or more frames. The frame data may be transmitted to the display device 220 to be viewed by the user. Content adjustor 214 may be used to implement the embodiments described above with FIGS. 1A-1B. Examples of the embodiments for exemplary system 210 or subsystem components, such as input receiver 212 and content adjustor 214, and methods or any parts or function(s) thereof may be implemented using hardware, software modules, firmware, tangible computer readable or computer usable storage media having instructions stored thereon, or a combination thereof and may be implemented in one or more computer systems or other processing systems.

Figure 3:
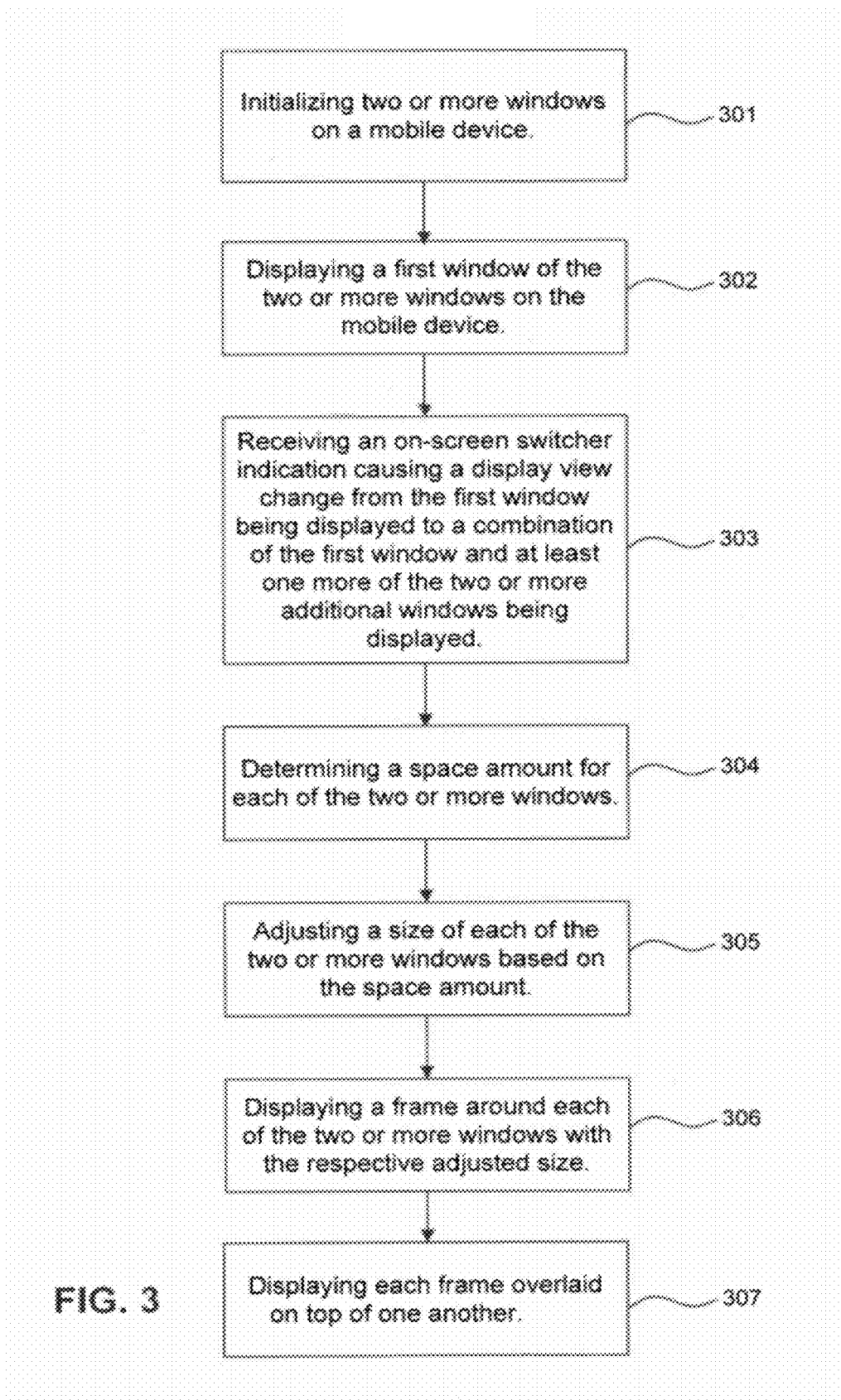
FIG. 3 is an illustration of a flow diagram of a method of operation, according to an embodiment.

FIG. 3 is an illustration of a flow diagram of an example method of operation, according to an embodiment. Referring to FIG. 3, the method may include initializing two or more windows on a mobile device, at step 301, and displaying a first window of the two or more windows on the mobile device, at step 302. The method may also include receiving an on-screen switcher indication causing a display view change from the first window being displayed to a combination of the first window and at least one more of the two or more additional windows being displayed, at step 303, and determining a space amount for each of the two or more windows, at step 304. the method may also include adjusting a size of each of the two or more windows based on the space amount, at step 305, displaying a frame around each of the two or more windows with the respective adjusted size, at step 306, and displaying each frame overlaid on top of one another, at step 307. According to an embodiment, steps 301-305 may be performed by system 210 with the assistance of display device 220.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described exemplary embodiments.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented method, comprising:
initializing two or more windows on a mobile device, wherein the two or more windows comprise:
a first window, and
one or more remaining windows;
displaying the first window of the two or more windows on the mobile device such that the one or more remaining windows are hidden from display;
receiving an on-screen switcher indication, wherein receiving the on-screen switcher indication comprises receiving a first input for a switcher icon; and
in response to receiving the on-screen switcher indication:
determining a space amount for each of the two or more windows,
adjusting a size of each of the two or more windows based on the space amount, and
displaying frames for each of the two or more windows, wherein each of the frames includes a viewable portion corresponding to the adjusted size of a respective window and at least portions of the frames are overlaid on top of each other;
receiving a second on-screen switcher indication, wherein receiving the second on-screen switcher indication comprises receiving a second input for the switcher icon; and
in response to receiving the second on-screen switcher indication:
displaying the first window of the two or more windows on the mobile device such that the one or more remaining windows are hidden from display.

2. The method of claim 1, wherein determining a space amount for each of the two or more windows comprises:
determining the space amount for each window according to the following formula:
(a height of total area−a padding)/(a number of pages*a scale amount), wherein the height of total area is a height of the area on the mobile device, padding is a predetermined amount of space between each window, the number of pages is the number of windows initialized, and the scale amount is a scaling factor variable that is inversely proportional to the number of pages.

3. The method of claim 1, wherein each of the two or more windows is at least one of an application or a webpage.

4. The method of claim 1, further comprising:
receiving a selection associated with a window of the two or more windows;
displaying the window associated with the selection without a frame; and
removing from display each of the two or more windows not associated with the selection.

5. The method of claim 1, wherein each frame includes an associated title and an associated favicon.

6. The method of claim 1, further comprising:
initializing one or more additional windows on the mobile device;
stacking the one or more additional windows, wherein the stacking includes displaying frames for each of the one or more additional windows, wherein the frames are stacked such that only a portion of the frames are viewable and their respective windows are hidden.

7. The method of claim 6, further comprising:
receiving a touch indication associated with the one or more additional windows displayed on the mobile device;
removing from display each of two or more windows; and
displaying each of the one or more additional windows until the maximum number of windows is reached by:
determining a space amount for each of the remaining number of windows,
adjusting a size of each of the remaining windows based on the space amount, and
displaying frames for each of the one or more additional windows wherein each of the frames includes a viewable portion corresponding to the adjusted size of a respective window and at least portions of the frames are overlaid on top of each other.

8. A system, comprising:
a display device configured to:
display a first window of two or more windows initialized on a mobile device, wherein the two or more windows comprise:
the first window, and
one or more remaining windows, wherein the one or more remaining windows are hidden from display;
display a switcher icon;
an input receiver, implemented with a computing device, configured to receive a first on-screen switcher indication by receiving a first input for the switcher icon and receive a second on-screen switcher indication by receiving a second input for the switcher icon; and
a content adjustor, implemented with a computing device, configured to:
in response to receiving the first on-screen switcher indication:
determine a space amount for the two or more windows,
adjust a size of the two or more windows based on the space amount,
provide to the display device each of the two or more windows including frames displayed for each of the windows, wherein each of the frames includes a viewable portion corresponding to the adjusted size of a respective window and at least portions of the frames are overlaid on top of each other; and
in response to receiving the second on-screen switch indication:
provide to the display device the first window displayed such that the one or more remaining windows are hidden from display.

9. The system of claim 8, wherein the content adjustor is further configured to determine a space amount for each of the two or more windows according to the following formula:
(a height of total area−a padding)/(a number of pages*a scale amount), wherein the height of total area is a height of the area on the mobile device, the padding is a predetermined amount of space between each window, the number of pages is the number of windows initialized, and the scale amount is a scaling factor variable that is inversely proportional to the number of pages.

10. The system of claim 8, wherein each of the two or more windows is at least one of an application or a webpage.

11. The system of claim 8, wherein the input receiver is further configured to:
receive a selection associated with a window of the two or more windows, and wherein the display device is further configured to:

display the window associated with the selection without a frame, and remove from display each of the two or more windows not associated with the selection.

12. The system of claim 8, wherein each window includes an associated title and an associated favicon.

13. The system of claim 8, wherein the content adjuster is further configured to:

provide to the display device one or more additional windows in stacked form initialized on the mobile device, wherein the stacked form includes displaying frames for each of the one or more additional windows, wherein the frames are stacked such that only a portion of the frames are viewable and their respective windows are hidden.

14. The system of claim 13, wherein the input receiver is further configured to:

receive a touch indication associated with the remaining number of the two or more windows displayed on the mobile device, and wherein the display device is further configured to:

remove from display each of two or more windows; and display each of the one or more additional windows until the maximum number of windows is reached by:

determining a space amount for each of the remaining number of windows, adjusting a size of each of the remaining windows based on the space amount, and displaying frames for each of the one or more additional windows wherein each of the frames includes a viewable portion corresponding to the adjusted size of a respective window and at least portions of the frames are overlaid on top of each other.

15. A non-transitory computer readable storage medium configured to store instructions that when executed causes a processor to perform:

initializing two or more windows on a mobile device, wherein the two or more windows comprise:

initializing two or more windows on a mobile device, wherein the two or more windows comprise:

a first window, and one or more remaining windows;

displaying the first window of the two or more windows on the mobile device such that the one or more remaining windows are hidden from display;

receiving an on-screen switcher indication, wherein receiving the on-screen switcher indication comprises receiving a first input for a switcher icon; and in response to receiving the on-screen switcher indication:

determining a space amount for each of the two or more windows, adjusting a size of each of the two or more windows based on the space amount, and displaying frames for each of the two or more windows, wherein each of the frames includes a viewable portion corresponding to the adjusted size of a respective window and at least portions of the frames are overlaid on top of each other;

receiving a second on-screen switcher indication, wherein receiving the second on-screen switcher indication comprises receiving a second input for the switcher icon; and in response to receiving the second on-screen switcher indication:

displaying the first window of the two or more windows on the mobile device such that the one or more remaining windows are hidden from display.

* * * * *